United States Patent
Hidaka et al.

(10) Patent No.: US 10,371,006 B2
(45) Date of Patent: Aug. 6, 2019

(54) MAINTENANCE METHOD FOR GAS TURBINE

(71) Applicant: MITSUBISHI HITACHI POWER SYSTEMS, LTD., Kanagawa (JP)

(72) Inventors: Kohei Hidaka, Yokohama (JP);
Susumu Wakazono, Yokohama (JP);
Toshihiro Takeda, Yokohama (JP);
Scott Cloyd, Lake Mary, FL (US);
Santo Scimeca, Lake Mary, FL (US)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 336 days.

(21) Appl. No.: 15/519,363

(22) PCT Filed: Nov. 19, 2014

(86) PCT No.: PCT/JP2014/080621
§ 371 (c)(1),
(2) Date: Apr. 14, 2017

(87) PCT Pub. No.: WO2016/079822
PCT Pub. Date: May 26, 2016

(65) Prior Publication Data
US 2017/0241289 A1 Aug. 24, 2017

(51) Int. Cl.
*F01D 25/16* (2006.01)
*F16C 17/03* (2006.01)
(Continued)

(52) U.S. Cl.
CPC .......... *F01D 25/162* (2013.01); *F01D 11/003* (2013.01); *F01D 21/003* (2013.01);
(Continued)

(58) Field of Classification Search
CPC .. F16C 2237/00; F16C 17/03; F16C 2360/23; Y10T 29/49718; Y10T 29/49719;
(Continued)

(56) References Cited

U.S. PATENT DOCUMENTS

| 6,016,600 A * | 1/2000 | Kennell ................. B23P 6/002 |
| | | 29/889.1 |
| 2007/0025840 A1* | 2/2007 | Weaver ................... F03D 13/10 |
| | | 415/122.1 |

(Continued)

FOREIGN PATENT DOCUMENTS

| JP | 52135947 A * 11/1977 |
| JP | 08-093408    4/1996 |

(Continued)

OTHER PUBLICATIONS

Machine translation of JP-52135947-A, published Nov. 14, 1977, retrieved Apr. 22, 2019 (Year: 1977).*

(Continued)

*Primary Examiner* — Sarang Afzali
*Assistant Examiner* — Darrell C Ford
(74) *Attorney, Agent, or Firm* — Wenderoth, Lind & Ponack, L.L.P.

(57) ABSTRACT

An exhaust-side journal bearing for supporting a gas turbine rotor is disposed inside a bearing box. The bearing box is supported by a strut which extends inward from an exhaust casing, and a seal ring having an annular inner peripheral end is disposed on the bearing box. Executed during a maintenance work are: a bearing adjustment step of displacing a bearing surface of the journal bearing relative to the bearing box in a perpendicular direction perpendicular to the axial direction; and a seal ring adjustment step of displacing the inner peripheral end of the seal ring relative to the (Continued)

bearing box in accordance with the direction of displacement and the amount of displacement of the bearing surface.

9 Claims, 15 Drawing Sheets

(51) Int. Cl.
*F01D 11/00* (2006.01)
*F16J 15/3268* (2016.01)
*F01D 21/00* (2006.01)
*F16J 15/3288* (2016.01)

(52) U.S. Cl.
CPC .............. *F01D 25/16* (2013.01); *F16C 17/03* (2013.01); *F16J 15/3268* (2013.01); *F16J 15/3288* (2013.01); F05D 2220/32 (2013.01); F05D 2230/72 (2013.01); F05D 2240/20 (2013.01); F05D 2240/50 (2013.01); F05D 2240/55 (2013.01); F16C 2237/00 (2013.01); F16C 2360/23 (2013.01); Y10T 29/49318 (2015.01); Y10T 29/49718 (2015.01); Y10T 29/49719 (2015.01); Y10T 29/49721 (2015.01); Y10T 29/49723 (2015.01); Y10T 29/49725 (2015.01)

(58) Field of Classification Search
CPC ......... Y10T 29/49721; Y10T 29/49723; Y10T 29/49725; Y10T 29/49318; F01D 25/162; F01D 21/003; F01D 11/003; F01D 25/16; F16J 15/3288; F16J 15/3268; F05D 2240/55; F05D 2230/72; F05D 2240/50; F05D 2220/32; F05D 2240/20

USPC .............. 29/402.01, 402.02, 402.03, 402.04, 29/402.05, 898.01
See application file for complete search history.

(56) References Cited

U.S. PATENT DOCUMENTS

| | | | | |
|---|---|---|---|---|
| 2010/0095683 A1* | 4/2010 | Glynn | ..................... | F01D 25/28 60/796 |
| 2010/0107385 A1* | 5/2010 | Floter | ..................... | F01D 25/28 29/23.51 |
| 2010/0296912 A1 | 11/2010 | McCallum et al. | | |
| 2011/0020116 A1 | 1/2011 | Hashimoto et al. | | |

FOREIGN PATENT DOCUMENTS

| | | |
|---|---|---|
| JP | 2009-243311 | 10/2009 |
| JP | 2010-270757 | 12/2010 |
| JP | 2011-231783 | 11/2011 |
| JP | 2013-076435 | 4/2013 |
| KR | 20-0424089 | 8/2006 |

OTHER PUBLICATIONS

Examiner's internet search history, search dated Apr. 22, 2019 (Year: 2019).*
International Search Report dated Feb. 24, 2015 in International Application No. PCT/JP2014/080621 (with English translation).
Written Opinion of the International Searching Authority dated Feb. 24, 2015 in International Application No. PCT/JP2014/080621 (with English Translation).

* cited by examiner

MAINTENANCE METHOD FOR GAS TURBINE

TECHNICAL FIELD

The present invention relates to a maintenance method for a gas turbine in which a gas turbine exhaust-side journal bearing supporting a gas turbine rotor is disposed in a bearing box.

BACKGROUND ART

A gas turbine includes a compressor that compresses outside air to generate compressed air, a combustor that mixes fuel with the compressed air and combusts a mixture of the fuel and the compressed air to generate combustion gas, and a turbine that is driven by the combustion gas. Each of the compressor and the turbine includes a rotor and a casing that covers the rotor. The casing of the compressor and the casing of the turbine are connected to each other and form a gas turbine casing. Further, the rotor of the compressor and the rotor of the turbine are connected to each other and form a gas turbine rotor. The gas turbine rotor is rotatably supported on both sides thereof in an axial direction by journal bearings.

Of the two journal bearings, the journal bearing which is disposed on the exhaust side of the gas turbine is covered with a bearing box as disclosed in, for example, Patent Document 1. The bearing box is fixed by a plurality of struts that extend from the bearing box in the tangential directions of the turbine rotor. End portions of the plurality of struts are fixed to an exhaust casing that forms a part of the casing of the turbine.

CITATION LIST

Patent Document

[Patent Document 1] Japanese Unexamined Patent Application, First Publication No. 2009-243311

SUMMARY OF INVENTION

Technical Problem

In a technique disclosed in Patent Document 1, there is a case in which the plurality of struts are deformed due to the long-term operation of the gas turbine and the bearing box fixed to the plurality of struts is displaced in a perpendicular direction perpendicular to the axis of the gas turbine rotor. In this case, the journal bearing provided in the bearing box is also displaced in the perpendicular direction. As a result, the gas turbine rotor, which is present at a position where the journal bearing is disposed in the axial direction, is moved in the perpendicular direction. Further, there is also a case in which the bearing box is not installed at a target position in the perpendicular direction due to assembly errors, manufacturing errors, or the like of various components. In this case, the journal bearing, which is provided in the bearing box, is also not installed at the target position in the perpendicular direction. As a result, the gas turbine rotor, which is present at the position where the journal bearing is disposed in the axial direction, is not disposed at the target position in the perpendicular direction. In these cases, a method of moving the above-mentioned exhaust casing relative to a turbine body casing, which forms a part of the casing of the turbine, in the perpendicular direction or the like is considered. However, this method has problems in that a maintenance period is lengthened and maintenance costs are also increased.

Accordingly, the invention has been made in consideration of the above-mentioned problems, and an object of the invention is to provide a maintenance method for a gas turbine that can shorten a maintenance period and reduce maintenance costs.

Solution to Problem

In order to solve the above-mentioned problems, according to an aspect of the invention, there is provided a maintenance method for a gas turbine where a gas turbine exhaust-side journal bearing for supporting a gas turbine rotor is disposed in a bearing box, the bearing box is supported by a strut extending from an exhaust casing of the gas turbine toward the inside of the exhaust casing, and a seal ring which includes an annular inner peripheral end and seals between one side and the other side thereof in an axial direction of the gas turbine rotor is provided in the bearing box. The maintenance method includes: a bearing adjustment step of displacing a bearing surface of the journal bearing relative to the bearing box in a perpendicular direction that is perpendicular to the axial direction in which the gas turbine rotor extends; and a seal ring adjustment step of displacing the inner peripheral end of the seal ring relative to the bearing box in accordance with the direction of displacement and the amount of displacement of the bearing surface.

In a case in which a plurality of struts are deformed and a bearing box fixed to the plurality of struts is displaced in a perpendicular direction perpendicular to an axis, or in a case in which a bearing box is not installed at a target position in the perpendicular direction due to assembly errors, manufacturing errors, or the like of various components, a journal bearing provided in the bearing box is also not installed at the target position in the perpendicular direction and a gas turbine rotor at a bearing position in the axial direction is not disposed at the target position in the perpendicular direction. In the maintenance method, the gas turbine rotor at the bearing position in the axial direction can be disposed at a target position in the perpendicular direction since the bearing surface of the journal bearing is displaced relative to the bearing box in the perpendicular direction perpendicular to the axial direction. In addition, in the maintenance method, the sealability of the seal ring can be ensured since the inner peripheral end of the seal ring is displaced relative to the bearing box in accordance with the direction of displacement and the amount of displacement of the bearing surface.

Here, in the maintenance method for a gas turbine, the journal bearing may include a pad on which the bearing surface is formed and a bearing housing that supports the pad from an outer peripheral side, and the bearing adjustment step may include a thickness change step of changing the thickness in the perpendicular direction of at least one component of one or more components, including the pad, disposed between an outer peripheral side of the gas turbine rotor and an inner peripheral side of the bearing housing.

Further, in any one of the above-described maintenance methods for a gas turbine, the journal bearing may include a pad on which the bearing surface is formed and a bearing housing that supports the pad from an outer peripheral side, and the bearing adjustment step may include an adjustment member disposition step of disposing a bearing surface adjustment member between the pad and the bearing housing or changing the thickness of a bearing surface adjustment member, which is disposed in advance, in the perpendicular direction.

In any one of the above-described maintenance methods for a gas turbine, the bearing adjustment step may include a thickness reduction step of cutting the bearing surface of the journal bearing.

In any one of the above-described maintenance methods for a gas turbine, the bearing adjustment step may include a bearing position change step of changing the position of the journal bearing relative to the bearing box in the perpendicular direction.

In any one of the above-described maintenance methods for a gas turbine, an annular outer peripheral end may be formed on an outer peripheral side of the annular inner peripheral end of the seal ring, and the seal ring adjustment step may include an inner peripheral end machining step of machining the seal ring so that the center of the annular inner peripheral end is eccentric to the center of the annular outer peripheral end.

In the maintenance method for a gas turbine including the inner peripheral end machining step, in the inner peripheral end machining step, a part of the inner peripheral end may be extended toward an inner peripheral side and another part of the inner peripheral end may be cut.

In any one of the above-described maintenance methods for a gas turbine, the seal ring adjustment step may include a seal ring position change step of changing the position of the seal ring relative to the bearing box in the perpendicular direction.

Any one of the above-described maintenance methods for a gas turbine may further include a displacement measurement step of measuring the amount of displacement and the direction of displacement of an actual position of the gas turbine rotor in the perpendicular direction at the bearing position with reference to a predetermined position of the gas turbine rotor in the perpendicular direction at the bearing position in the axial direction. In the bearing adjustment step, the bearing surface of the journal bearing may be displaced relative to the bearing box according to the amount of displacement in a direction opposite to the direction of displacement. In the seal ring adjustment step, the inner peripheral end of the seal ring may be displaced relative to the bearing box according to the amount of displacement in a direction opposite to the direction of displacement.

Advantageous Effects of Invention

According to an aspect of the invention, it is possible to shorten a maintenance period for a gas turbine and to reduce maintenance costs.

DESCRIPTION OF EMBODIMENTS

Embodiment

An embodiment of a maintenance method for a gas turbine according to the invention will be described in detail below with reference to FIGS. 1 to 11.

Figure 1:
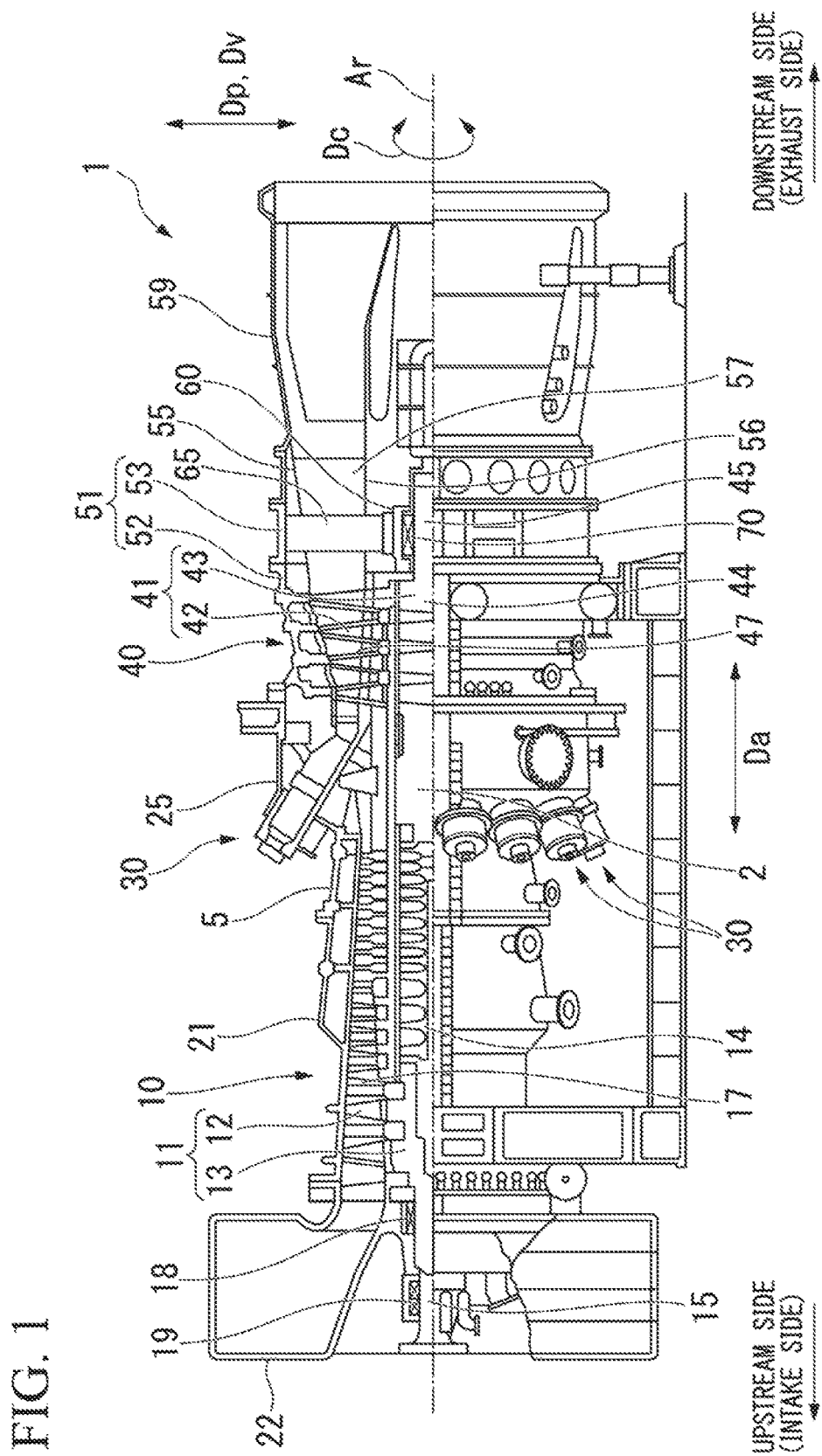
FIG. 1 is a cut-out side view of main parts of a gas turbine of an embodiment of the invention.

As shown in FIG. 1, a gas turbine 1 of this embodiment includes a compressor 10 that compresses outside air to generate compressed air, a plurality of combustors 30 that mix fuel supplied from a fuel supply source with the compressed air and combust a mixture of the fuel and the compressed air to generate combustion gas, and a turbine 40 that is driven by the combustion gas.

The compressor 10 includes a compressor rotor 11 that rotates about an axis Ar, a compressor casing 21 that covers the compressor rotor 11, and an intake chamber 22 that guides air into the compressor casing 21. The turbine 40 includes a turbine rotor 41 that rotates about the axis Ar, a turbine casing 51 that covers the turbine rotor 41, and an exhaust chamber 59 that guides exhaust gas from the turbine casing 51 to the outside. The compressor rotor 11 and the turbine rotor 41 are connected to each other so that the axis Ar of the compressor rotor 11 and the axis Ar of the turbine rotor 41 are positioned on the same line, and form a gas turbine rotor 2. In the following description, a direction in which the axis Ar extends is referred to as an axial direction Da and a direction perpendicular to the axis Ar is referred to as a perpendicular direction Dp. Further, the side of the compressor 10 relative to the turbine 40 in the axial direction Da is referred to as an upstream side or an intake side, and the side of the turbine 40 relative to the compressor 10 in the axial direction Da is referred to as a downstream side or an exhaust side.

The compressor rotor 11 includes a plurality of blade stages 12 that are arranged in the axial direction Da and a rotor body 13 to which the plurality of blade stages 12 are fixed. Each of the blade stages 12 includes a plurality of blades that are arranged in a circumferential direction Dc of the axis Ar. The rotor body 13 includes a blade fixing portion 14 to which the plurality of blade stages 12 are fixed, and a shaft portion 15 that extends toward the upstream side from an upstream end of the blade fixing portion 14. The turbine rotor 41 includes a plurality of blade stages 42 that are arranged in the axial direction Da and a rotor body 43 to which the plurality of blade stages 42 are fixed. Each of the blade stages 42 includes a plurality of blades that are arranged in the circumferential direction Dc. The rotor body 43 includes a blade fixing portion 44 to which the plurality of blade stages 42 are fixed, and a shaft portion 45 that extends toward the downstream side from a downstream end of the blade fixing portion 44. The turbine casing 51 includes a turbine body casing 52 that covers the blade fixing portion 44 of the turbine rotor 41 and an exhaust casing 53 that covers the shaft portion 45 of the turbine rotor 41. Each of the shaft portion 15 of the compressor rotor 11 and the shaft portion 45 of the turbine rotor 41 has a columnar shape about the axis Ar.

A space between the outer peripheral side of the rotor body 13 of the compressor rotor 11 and the inner peripheral side of the compressor casing 21 forms a compressed air passage 17 in which intake air is gradually compressed. A space between the outer peripheral side of the rotor body 43 of the turbine rotor 41 and the inner peripheral side of the turbine body casing 52 forms a combustion gas passage 47 in which combustion gas flows.

The gas turbine 1 further includes a combustor casing 25 that is disposed between the compressor casing 21 and the turbine casing 51 in the axial direction Da and covers a connection portion between the compressor rotor 11 and the turbine rotor 41. The above-mentioned plurality of combustors 30 are fixed to the combustor casing 25. The compressor casing 21, the combustor casing 25, and the turbine casing 51 are connected to each other and form a gas turbine casing 5.

The gas turbine 1 includes bearings that support the gas turbine rotor 2 so as to allow the gas turbine rotor 2 to rotate. The gas turbine 1 includes two journal bearings 18 and 70 and one thrust bearing 19 as the bearings. An intake-side end portion of the gas turbine rotor 2 is rotatably supported by one journal bearing 18 of the two journal bearings 18 and 70 and one thrust bearing 19, and an exhaust-side end portion of the gas turbine rotor 2 is rotatably supported by the other journal bearing 70. In other words, the shaft portion 15 of the compressor rotor 11 is rotatably supported by one journal bearing 18 and one thrust bearing 19, and the shaft portion 45 of the turbine rotor 41 is rotatably supported by the other journal bearing 70.

Figure 2:
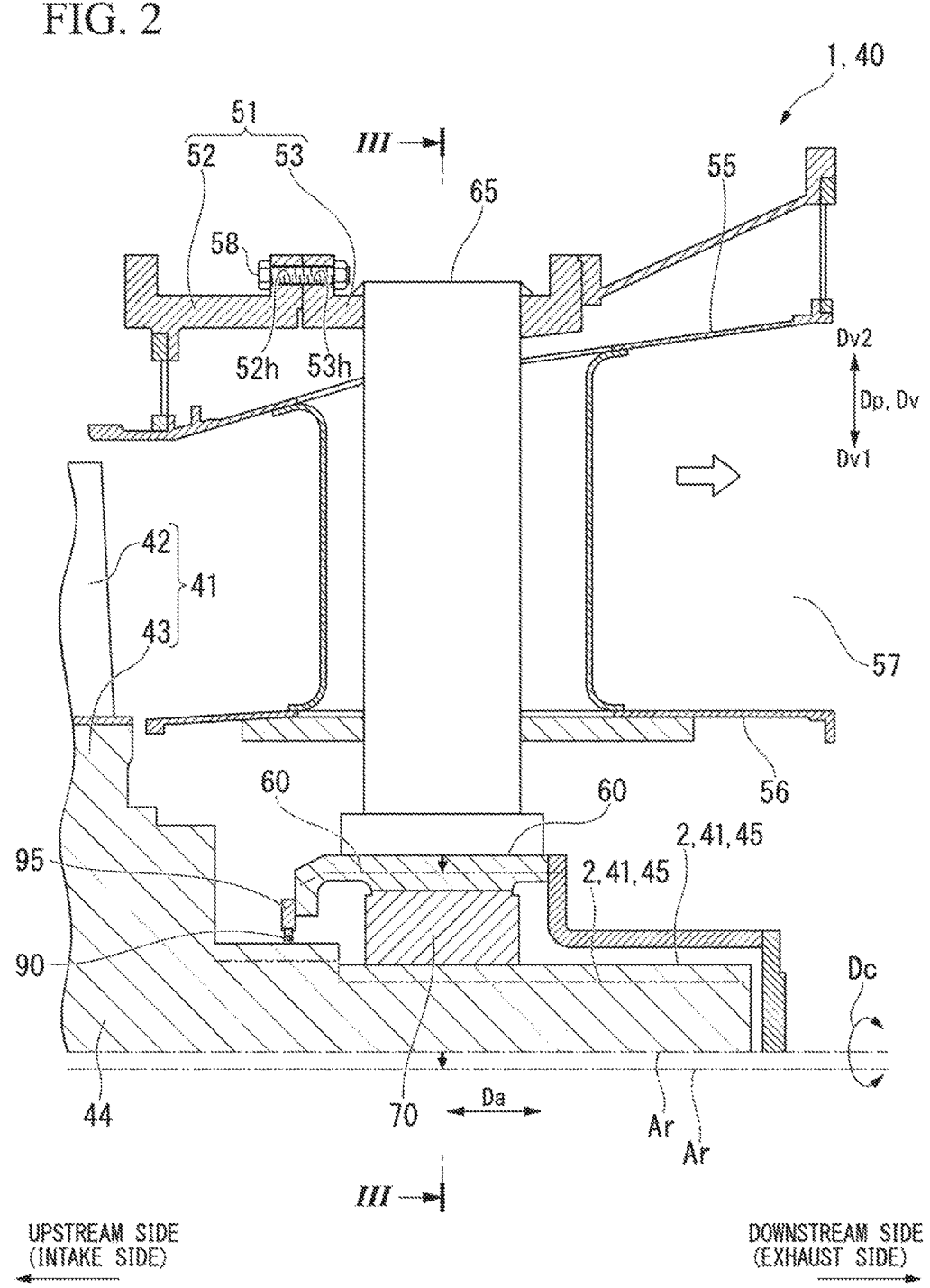
FIG. 2 is a cross-sectional view of main parts of the gas turbine of the embodiment of the invention.
Figure 3:
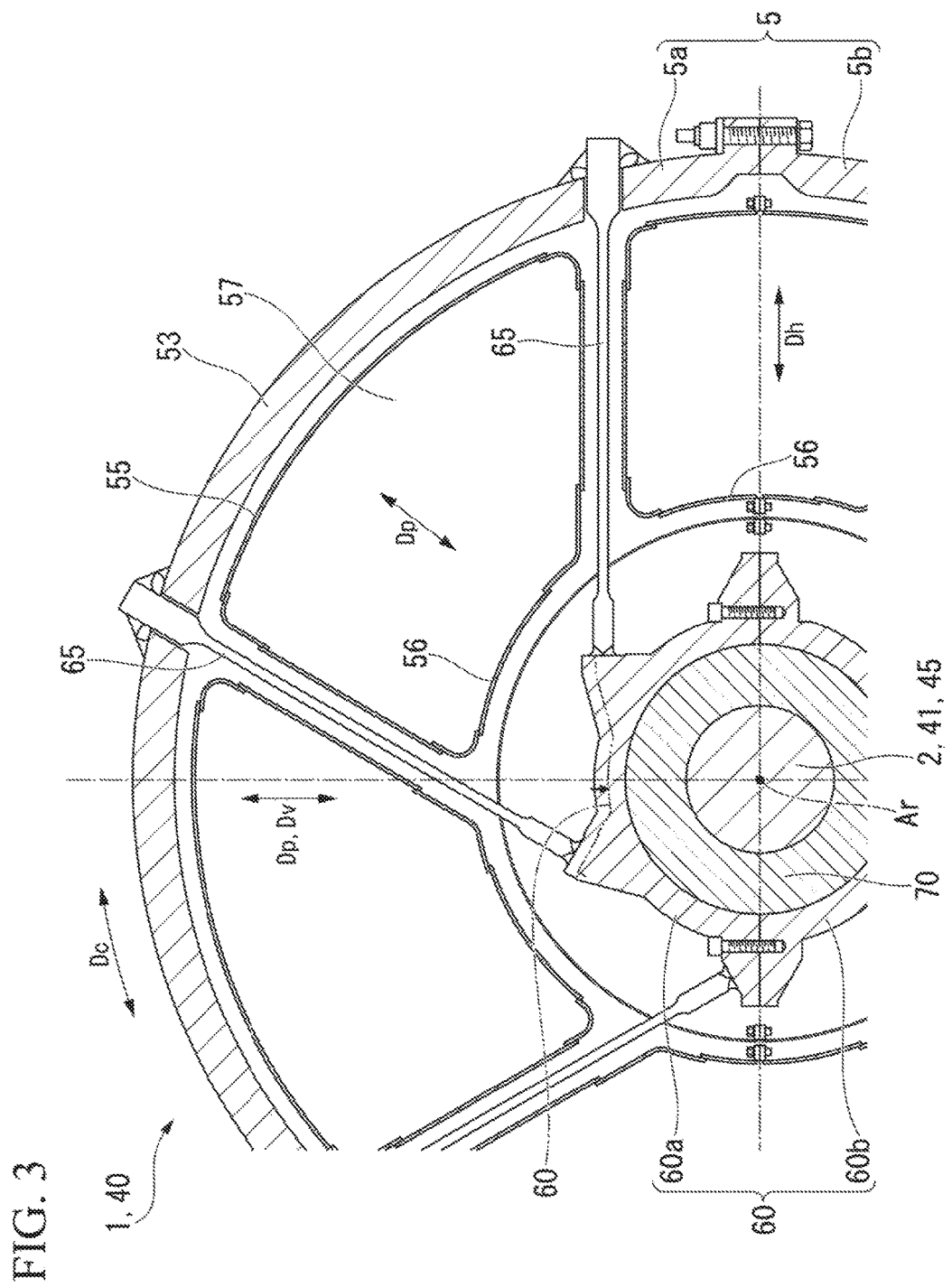
FIG. 3 is a cross-sectional view taken along line III-III of FIG. 2.

As shown in FIGS. 2 and 3, the journal bearing 70, which supports the shaft portion 45 of the turbine rotor 41 so as to allow the shaft portion 45 to rotate, is covered with a bearing box 60 and is mounted to the bearing box 60. The bearing box 60 includes an upper-half bearing box 60a that covers the upper half of the journal bearing 70 and a lower-half bearing box 60b that covers the lower half of the journal bearing 70. The bearing box 60 is fixed by a plurality of struts 65 that extend from the bearing box 60 in the tangential directions of the turbine rotor 41. The outer peripheral-side end portions of the plurality of struts 65 are fixed to the exhaust casing 53. A seal ring 90 is fixed to the bearing box 60 through a retainer 95. Each of the seal ring 90 and the retainer 95 has an annular shape about the axis Ar. The seal ring 90 functions to seal between one side and the other side of the seal ring 90 in the axial direction Da in the shaft portion 45 of the turbine rotor 41.

An outer diffuser 55 and an inner diffuser 56, which have a cylindrical shape about the axis Ar, are disposed in the exhaust casing 53. The outer diffuser 55 is provided along the inner peripheral surface of the exhaust casing 53. The inner diffuser 56 is disposed on the inner peripheral side of the outer diffuser 55 with an interval between itself and the outer diffuser 55. A space between the outer diffuser 55 and the inner diffuser 56 forms an exhaust passage 57 through which the combustion gas having rotated the turbine rotor 41 passes as exhaust gas. The bearing box 60 is disposed on the inner peripheral side of the inner diffuser 56 with an interval between itself and the inner diffuser 56. All of the plurality of struts 65 extend from the bearing box 60 in the tangential directions as described above, pass through the inner diffuser 56 and the outer diffuser 55, and are fixed to the exhaust casing 53.

Figure 4:
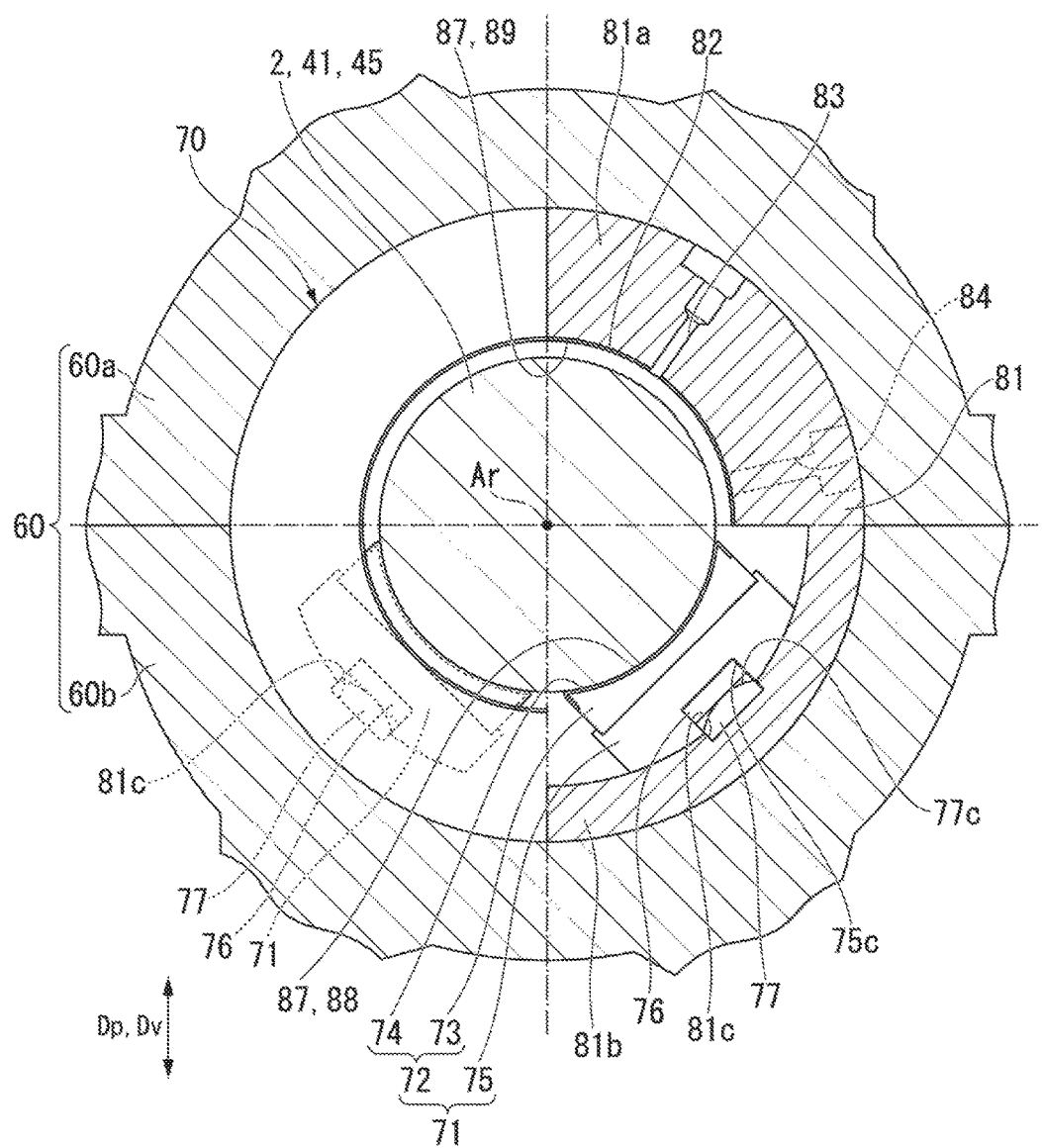
FIG. 4 is a cross-sectional view of a journal bearing of the embodiment of the invention.

As shown in FIG. 4, the journal bearing 70, which supports the shaft portion 45 of the turbine rotor 41 so as to allow the shaft portion 45 to rotate, includes pads 71 on which support bearing surfaces 88 facing the outer peripheral surface of the shaft portion 45 are formed, liners 76 that are disposed on the outer peripheral sides of the pads 71, pivots 77 that are in contact with the liners 76 and support the pads 71 so as to allow the pads 71 to oscillate, and a bearing housing 81 on the inner peripheral side of which the pivot 77 is mounted.

Each of the pads 71 includes a pad body 72 on which the support bearing surface 88 is formed and a base 75 that supports the pad body 72 from the outer peripheral side. The support bearing surface 88 is a curved surface that has a radius of curvature slightly larger than the radius of the shaft portion 45. The pad body 72 includes a body base 73 and a support bearing layer 74 that is formed on the body base 73. The body base 73 is made of, for example, iron, chrome steel, copper, or the like. Further, the support bearing layer 74 is made of, for example, soft metal, such as white metal, an aluminum alloy, a copper-lead alloy, or a lead overlay, a PTFE (Polytetrafluoroethylene) resin, a PEEK (Polyetheretherketone) resin, or the like. The surface of the support bearing layer 74 forms the above-mentioned support bearing surface 88.

A liner mounting groove 75c, which is recessed toward the inner peripheral side, is formed on the outer peripheral side of the base 75. The liner 76 is disposed in the liner mounting groove 75c. The pivot 77 is disposed on the outer peripheral side of the liner 76. The surface of the pivot 77, which faces the liner 76, forms a smooth curved surface 77c that is convex toward the liner 76. The liner 76 is substantially in point contact with the curved surface 77c of the pivot 77, and oscillates in each direction about a portion that is in contact with the pivot 77.

The bearing housing 81 is a cylindrical member that has a circular outer peripheral surface about the axis Ar. A semicircular inner peripheral surface, which has a radius slightly larger than the radius of the shaft portion 45, is formed on an upper half 81a of the bearing housing 81. This inner peripheral surface forms a restraining bearing surface 89 that faces the outer peripheral surface of the shaft portion 45. A semicircular inner peripheral surface, which has a radius larger than the radius of the inner peripheral surface of the upper half 81a, is formed on a lower half 81b of the bearing housing 81. Pivot mounting grooves 81c, which are recessed toward the outer peripheral side, are formed on this inner peripheral surface at two positions in the circumferential direction around the axis Ar. The above-mentioned pivots 77 are disposed in the pivot mounting grooves 81c. Accordingly, the pivots 77, the liners 76, and the pads 71 are disposed between the inner peripheral surface of the lower half 81b of the bearing housing 81 and the outer peripheral surface of the shaft portion 45. A lubricant introduction hole 83 and a lubricant discharge hole 84, which pass through the bearing housing 81 from the outer peripheral side to the inner peripheral side, are formed in the bearing housing 81.

In the journal bearing 70 of this embodiment, the shaft portion 45 of the turbine rotor 41 is in contact with the support bearing surfaces 88 of the pads 71, which are disposed on the inner peripheral side of the lower half 81b of the bearing housing 81, through a lubricant, and is supported by the pads 71. Further, the shaft portion 45 of the turbine rotor 41 faces the restraining bearing surface 89 of the upper half 81a of the bearing housing 81, but is not in contact with the restraining bearing surface 89 basically. However, in a case in which abnormal vibration or the like of the turbine rotor 41 occurs, the shaft portion 45 may come into contact with the restraining bearing surface 89 through a lubricant. For this reason, the restraining bearing surface 89 is made of white metal or the like as in the case of the support bearing surface 88. In this embodiment, a bearing surface 87 is a surface that faces the outer peripheral surface of the turbine rotor 41 and may come into contact with the turbine rotor 41. Furthermore, the support bearing surfaces 88 of the bearing surface 87 are surfaces that are in contact with the turbine rotor 41 through a lubricant and function to support the turbine rotor 41 so as to allow the turbine rotor 41 to rotate. Moreover, the restraining bearing surface 89 of the bearing surface 87 is a surface that may come into contact with the turbine rotor 41 through a lubricant but functions to restrain the relatively large movement of the turbine rotor 41 in the perpendicular direction Dp without functioning to support the turbine rotor 41 so as to allow the turbine rotor 41 to rotate.

Figure 5:
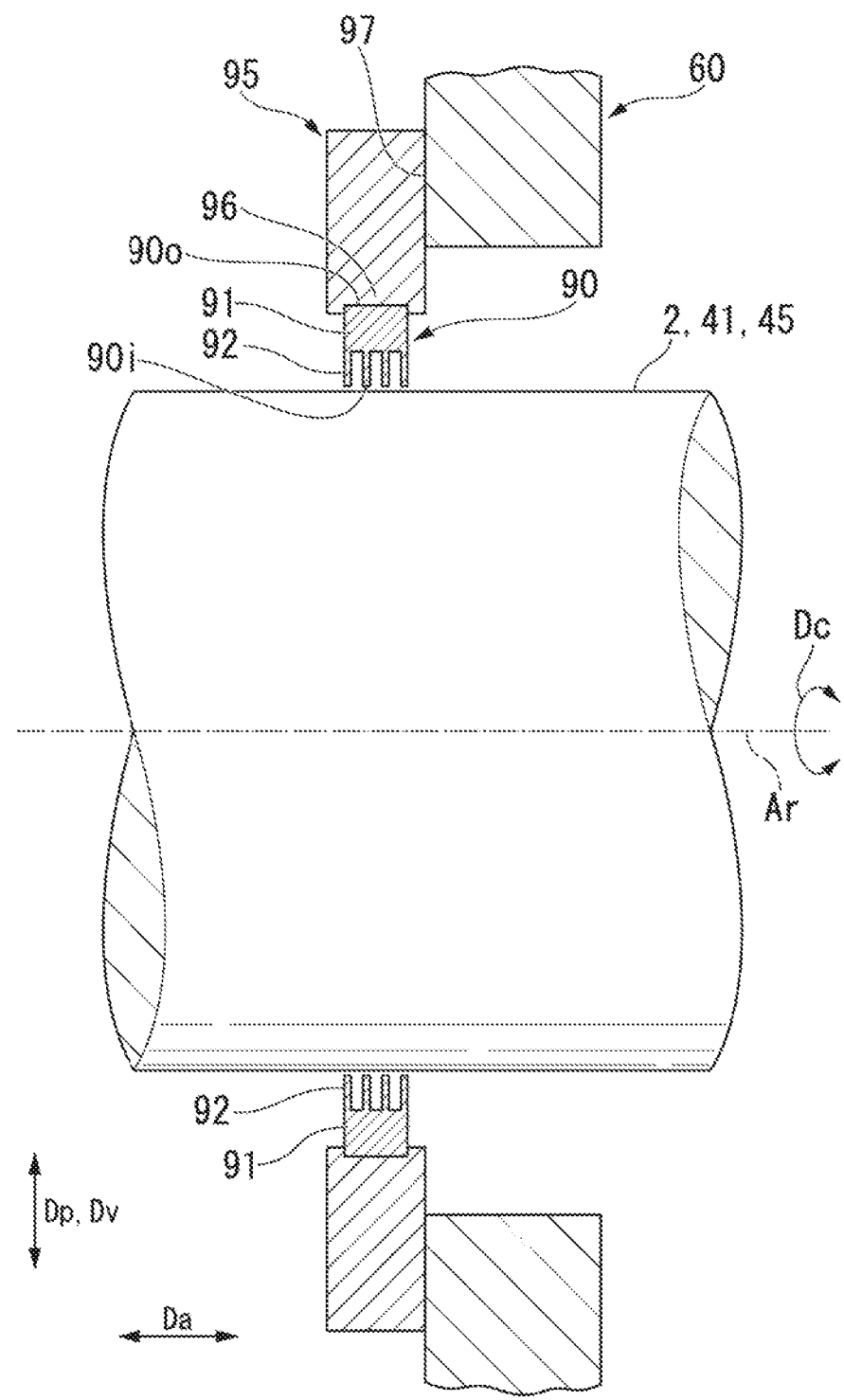
FIG. 5 is a cross-sectional view of a seal ring of the embodiment of the invention.
Figure 6:
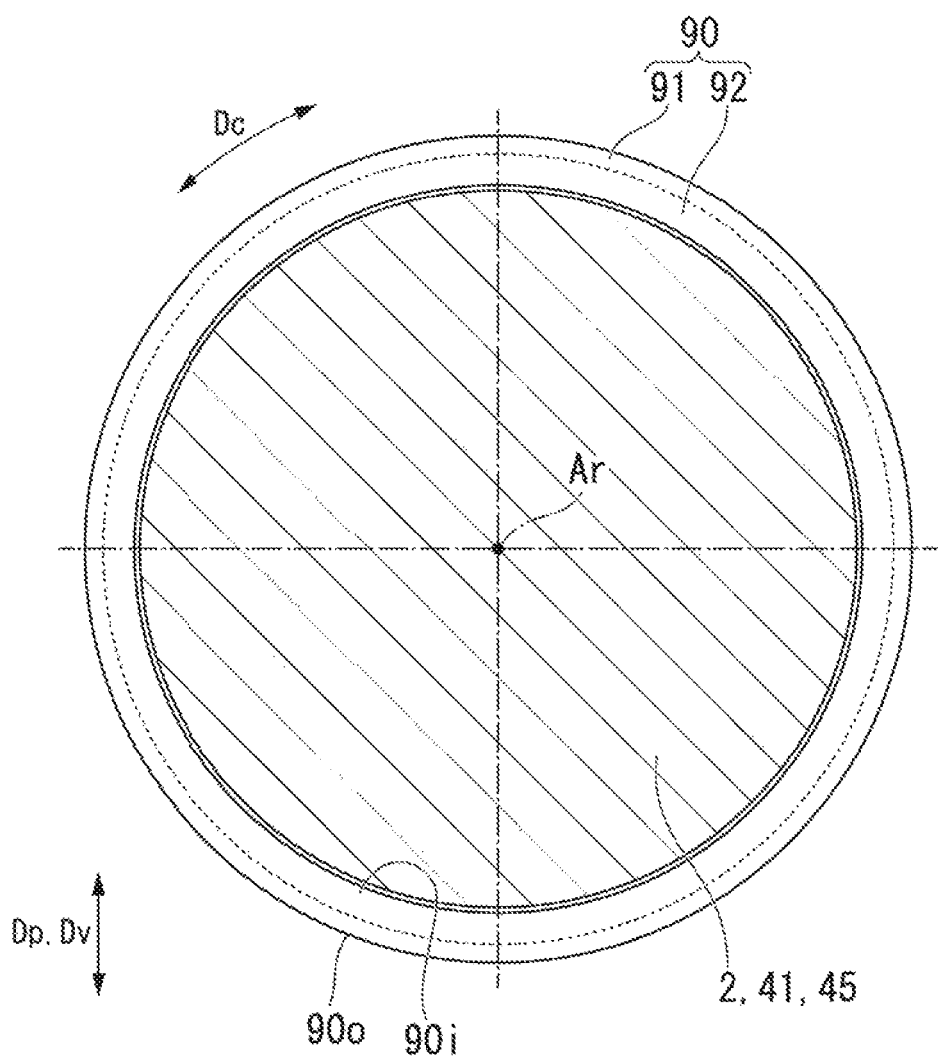
FIG. 6 is a front view of the seal ring of the embodiment of the invention.

As shown in FIGS. 5 and 6, the seal ring 90 includes an annular tooth base 91 and a plurality of teeth 92 that protrude from the annular tooth base 91 to the inner peripheral side. The plurality of teeth 92 are arranged in the axial direction Da of the turbine rotor 41. Each of the teeth 92 is formed over the entire area of the turbine rotor 41 in the circumferential direction Dc around the axis Ar. Accordingly, an inner peripheral end of each tooth 92 is formed in an annular shape. An outer peripheral end 90o of the seal ring 90 is the outer peripheral end of the annular tooth base 91 around the axis Ar of the turbine rotor 41, and an inner peripheral end 90i of the seal ring 90 is inner peripheral ends of the annular teeth 92 around the axis Ar of the turbine rotor 41. The retainer 95 is a member that has an annular shape about the axis Ar of the turbine rotor 41 as described above. A seal ring mounting portion 96 on which the seal ring 90 is to be mounted is formed on the inner periphery of the retainer 95. Further, a portion to be mounted 97, which is used to mount the retainer 95 on the bearing box 60, is formed on the retainer 95. Each of the annular seal ring 90 and the annular retainer 95 can be separated into an upper half and a lower half.

In the above-described gas turbine 1 of this embodiment, there is a case in which the bearing box 60 is not installed at a target position in the perpendicular direction Dp due to assembly errors or manufacturing errors of various components, deformation of the struts 65 fixing the bearing box 60, or the like. In this embodiment, a maintenance method in a case in which the bearing box 60 is displaced vertically downward Dv1 from the target position will be described by way of example. In this case, the journal bearing 70 positioned in the bearing box 60 is also displaced vertically downward Dv1. As a result, the gas turbine rotor 2, which is present at a position where the exhaust-side journal bearing 70 is disposed in the axial direction Da, is moved vertically downward Dv1. When the gas turbine rotor 2, which is present at the position where the exhaust-side journal bearing 70 is disposed, is moved vertically downward Dv1, a balance between a bearing load that is borne by the intake-side journal bearing 18 and a bearing load that is borne by the exhaust-side journal bearing 70 is lost. For this reason, there is also a case in which the life of each journal bearing 18, 70 is shortened and abnormal vibration of the gas turbine rotor 2 is caused.

Figure 12:
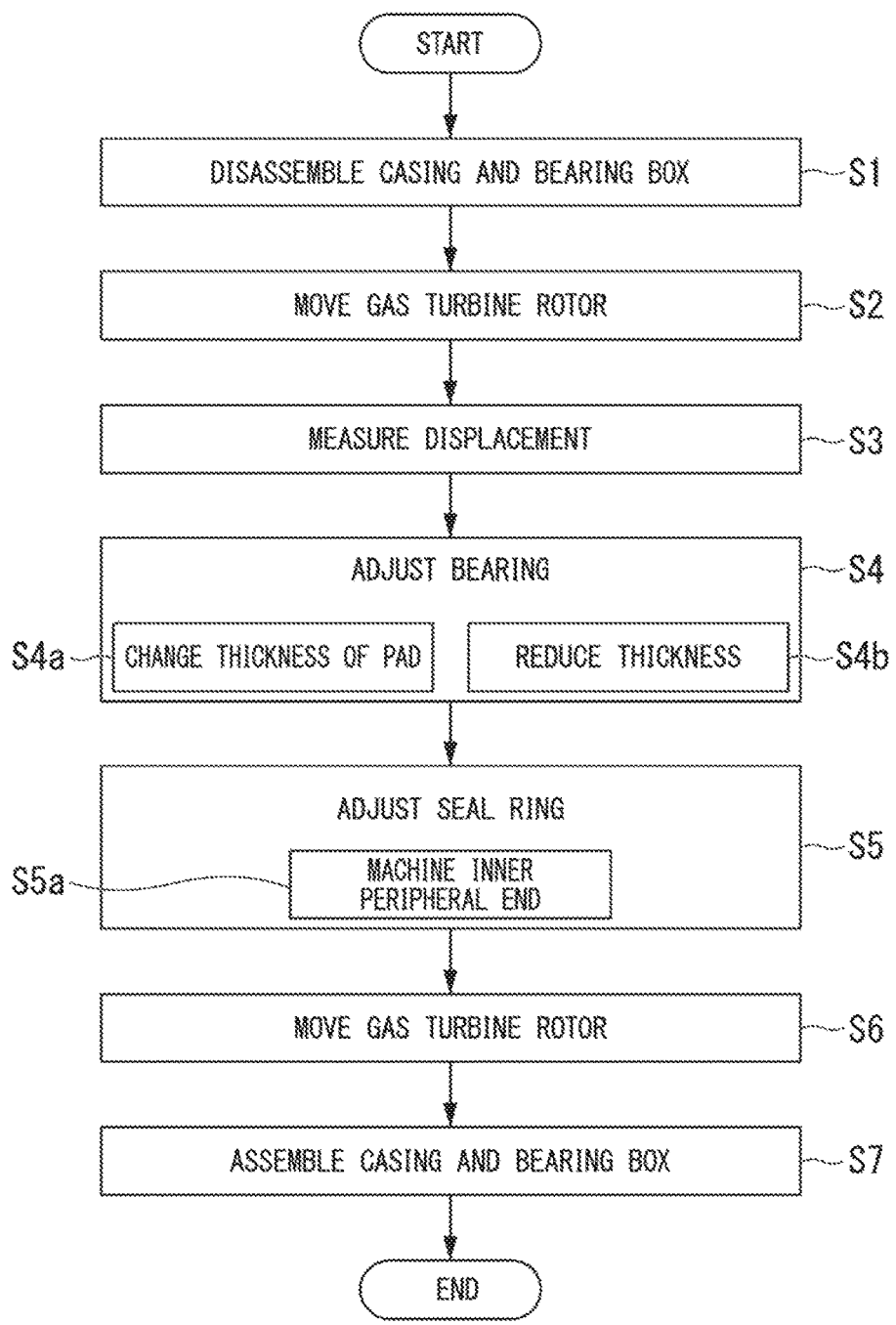
FIG. 12 is a flow chart showing a procedure of a maintenance method of the embodiment of the invention.

In such a case, maintenance is performed in this embodiment by a procedure shown in a flow chart of FIG. 12.

Figure 7:
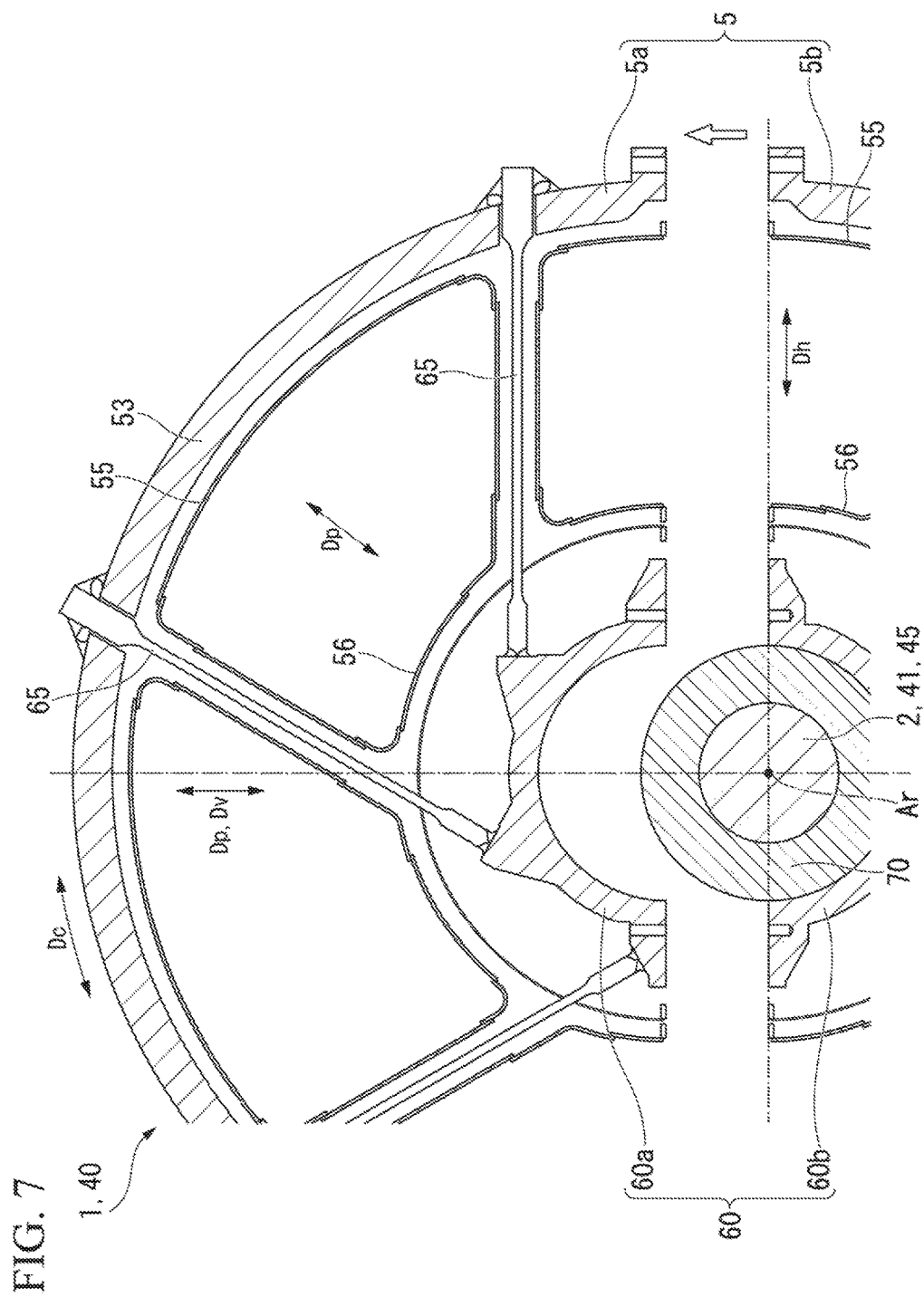
FIG. 7 is a cross-sectional view of the gas turbine while a gas turbine casing of the embodiment of the invention is being disassembled.

First, the upper half of the gas turbine casing 5 including the exhaust casing 53 and the upper half of the bearing box 60 are disassembled as shown in FIG. 7. That is, a gas turbine upper-half casing 5a is removed from a gas turbine lower-half casing 5b and the upper-half bearing box 60a is removed from the lower-half bearing box 60b (S1: casing disassembly step).

Next, the bearings and the gas turbine rotor 2, which are housed in the gas turbine lower-half casing 5b, are moved to the outside of the gas turbine lower-half casing 5b (S2: gas turbine rotor movement step).

After that, the amount of displacement and the direction of displacement of the position of the gas turbine rotor 2 in the perpendicular direction Dp at a bearing position where the exhaust-side journal bearing 70 is disposed in the axial direction Da are measured (S3: displacement measurement step). The direction of displacement is a vertical direction Dv of the perpendicular direction Dp in this embodiment, but may not be the vertical direction Dv. Further, when a position in the perpendicular direction Dp at the bearing position of the gas turbine rotor 2 at the beginning of the manufacture of the gas turbine 1 is set as a reference position, displacement may be displacement relative to the reference position. Furthermore, when the same position as the position of the gas turbine rotor 2 in the perpendicular direction Dp at a position in the axial direction Da where the intake-side journal bearing 18 is disposed is set as the reference position of the gas turbine rotor 2 in the perpendicular direction Dp at the exhaust-side bearing position, displacement may be displacement relative to the reference position. In any case, a predetermined position of the gas turbine rotor 2 in the perpendicular direction Dp at the exhaust-side bearing position is set as a reference position.

At the time of the measurement of displacement, the removed upper-half bearing box 60a is assembled with the lower-half bearing box 60b again and the gas turbine upper-half casing 5a is assembled with the gas turbine lower-half casing 5b, from which the gas turbine rotor 2 has been removed, again. The measurement of displacement is performed by, for example, the same method as a laser alignment method. Specifically, a laser oscillator and a laser detector are mounted at predetermined positions in the gas turbine casing 5 and laser is oscillated from the laser oscillator and is detected by the laser detector, so that the amount of displacement and the direction of displacement are measured. After the measurement of displacement, again, the gas turbine upper-half casing 5a is removed from the gas turbine lower-half casing 5b and the upper-half bearing box 60a is removed from the lower-half bearing box 60b.

Figure 8:
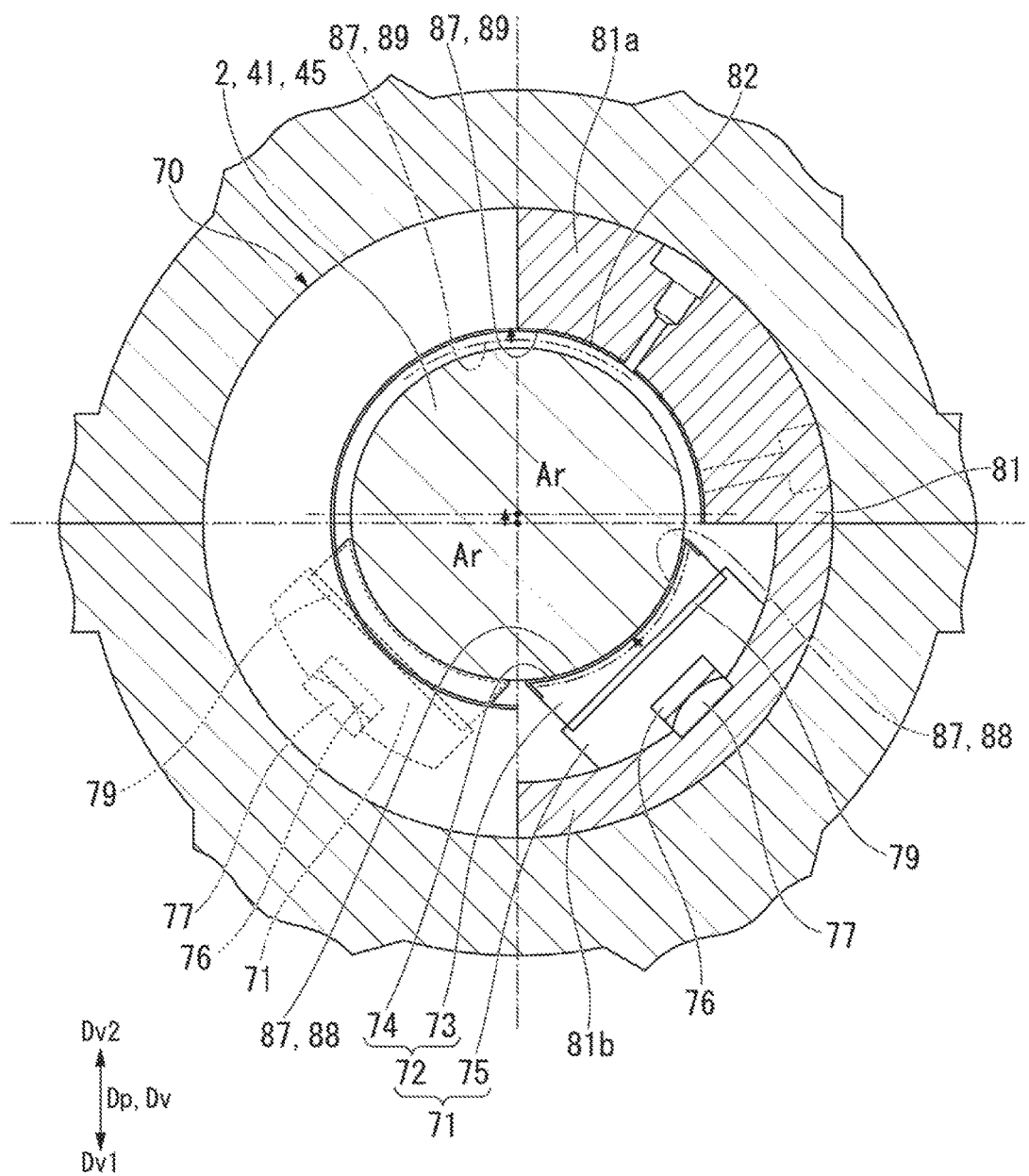
FIG. 8 is a cross-sectional view of the journal bearing after a bearing adjustment step of the embodiment of the invention.

Next, as shown in FIG. 8, the journal bearing 70 is adjusted so that the bearing surface 87 of the journal bearing 70 is moved relative to the bearing box 60 in the perpendicular direction Dp (S4: bearing adjustment step). In a case in which the bearing box 60 is moved vertically downward Dv as described above, in the bearing adjustment step (S4), the thickness of each of the pads 71 housed in the lower half 81b of the bearing housing 81 is increased (S4a: thickness change step) and a part of the restraining bearing surface 89 of the upper half 81*a* of the bearing housing 81 is cut (S4*b*: thickness reduction step). When the bearing adjustment step (S4) is performed, the position of the shaft portion 45 in the perpendicular direction Dp, which is determined by the support bearing surfaces 88 and the restraining hearing surface 89, is moved vertically upward Dv2 from the position of the shaft portion 45 that is obtained before the bearing adjustment step (S4) is performed.

The amount and direction of the increase of the thickness of each of the pads 71 housed in the lower half 81*b* of the bearing housing 81, and the amount and direction of the cut of the restraining bearing surface 89 are determined so that the position of the shaft portion 45 in the perpendicular direction Dp, which is determined by the support bearing surfaces 88 and the restraining bearing surface 89, is moved by the amount of displacement, which is measured in the displacement measurement step (S3), in a direction opposite to the direction of displacement, which is measured in the displacement measurement step (S3), that is, vertically upward Dv2 in this case.

Here, a method of inserting a bearing surface adjustment member 79, such as a shim, between the pad body 72 and the base 75 of each pad 71 as shown in FIG. 8 is employed as a method of increasing the thickness of the pad 71. Other than the above-mentioned method, a method of replacing at least one of the pad body 72 and the base 75 of the pad 71 with a member having a different thickness, a method of overlaying the support bearing surface 88 with white metal or the like, which forms the support bearing layer 74, before the thickness change step (S4*a*) for the pad 71 is performed, and the like are used as a method of increasing the thickness of the pad 71.

When a part of the restraining bearing surface 89 is cut to form a new restraining bearing surface 89, after the restraining bearing surface 89 is cut, the surface of a restraining bearing layer 82 which is made of white metal or the like and of which the surface forms the restraining bearing surface 89 is overlaid with white metal or the like so that the thickness of the restraining bearing layer 82 becomes a target thickness.

Figure 9:
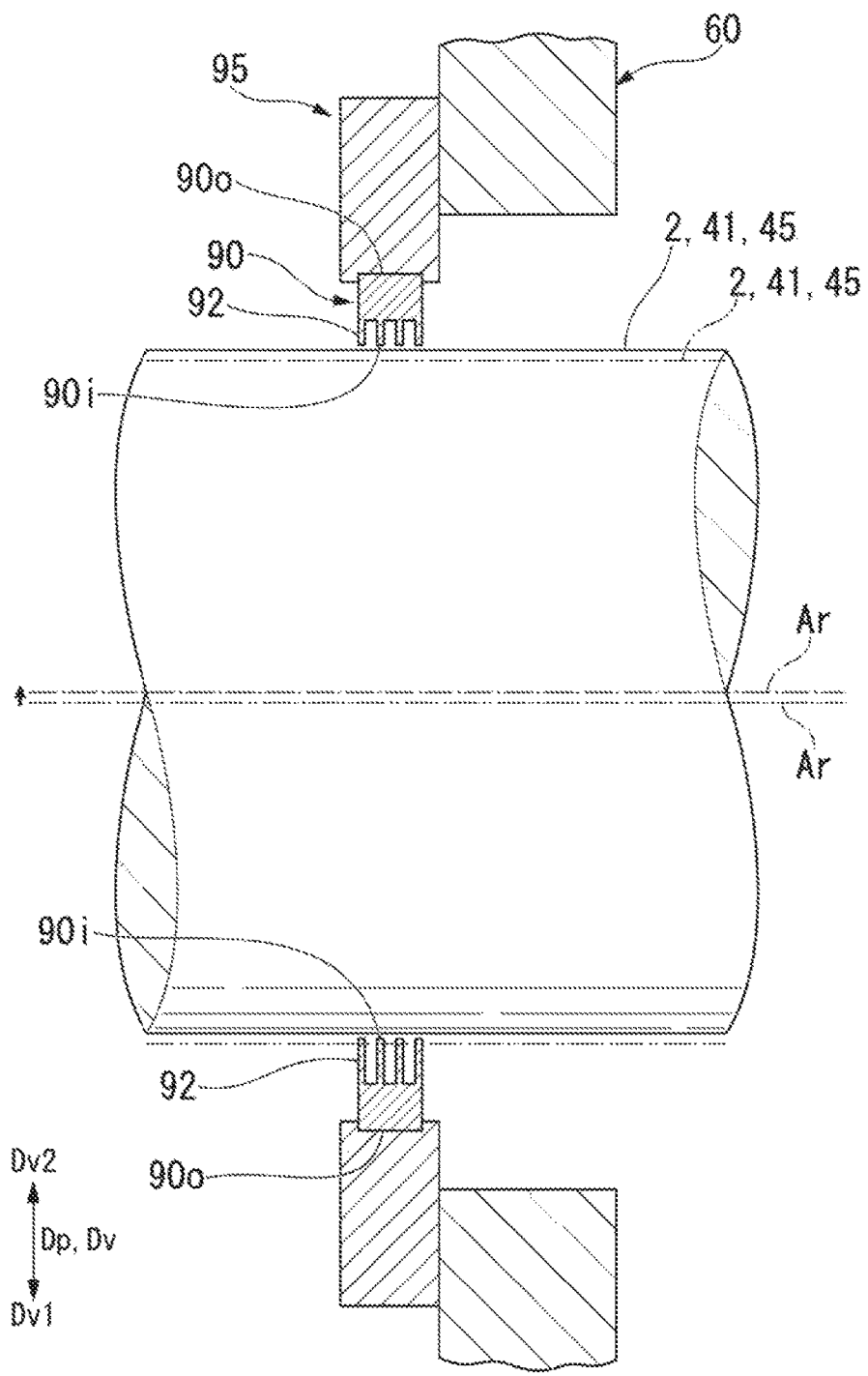
FIG. 9 is a cross-sectional view of the seal ring after a seal ring adjustment step of the embodiment of the invention.
Figure 10:
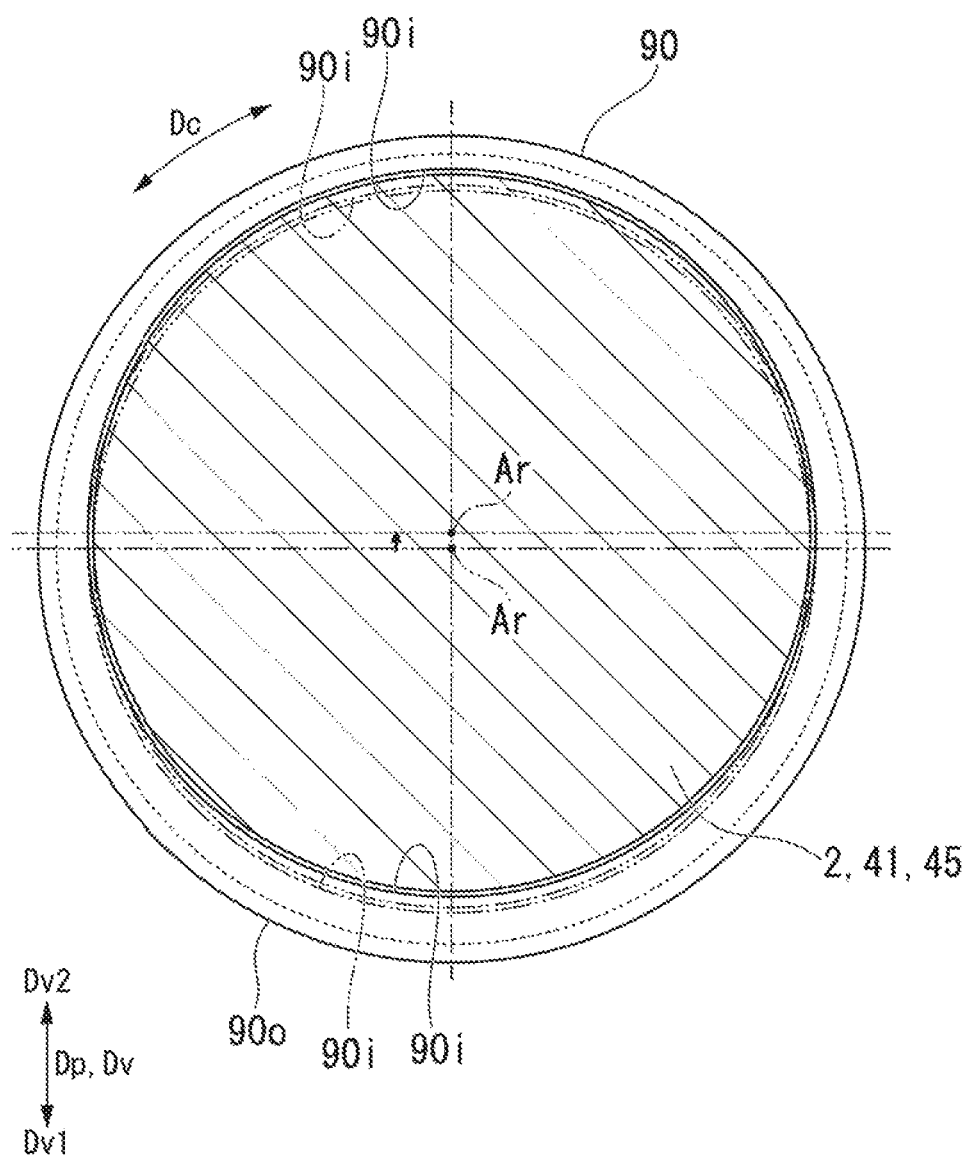
FIG. 10 is a front view of the seal ring after the seal ring adjustment step of the embodiment of the invention.

Next, as shown in FIGS. 9 and 10, the seal ring 90 is adjusted so that the inner peripheral end 90*i* of the seal ring 90 is moved relative to the bearing box 60 (S5: seal ring adjustment step). In a case in which the bearing box 60 is moved vertically downward Dv1 as described above, the inner peripheral end 90*i* is machined in the seal ring adjustment step (S5) so that the center of the annular inner peripheral end 90*i* is eccentric to the center of the annular outer peripheral end 90*o* of the seal ring 90 (S5*a*: inner peripheral end machining step). In the inner peripheral end machining step (S5*a*), a part of the inner peripheral end 90*i* is extended toward the inner peripheral side and another part of the inner peripheral end 90*i* is cut. In a case in which the bearing box 60 is moved vertically downward Dv1 as described above, a lower portion of the inner peripheral end 90*i* is extended and an upper portion of the inner peripheral end 90*i* is cut. When the seal ring adjustment step (S5) is performed, the seal position of the seal ring 90 relative to the shaft portion 45 of which the position is determined by the bearing adjustment step (S4) can be optimized.

The amount and direction of extension of a part of the inner peripheral end 90*i* of the seal ring 90 and the amount and direction of the cut of the other part of the inner end are made to correspond to the amount and direction of the increase of the thickness of each pad 71 and the amount and direction of the cut of the restraining bearing surface 89 that are determined in the bearing adjustment step (S4). That is, the amount and direction of the extension of a part of the inner peripheral end 90*i* of the seal ring 90 and the amount and direction of the cut of the other part of the inner end are determined so that the position of the shaft portion 45 in the perpendicular direction Dp, which is determined by the inner peripheral end 90*i* of the seal ring 90, is moved by the amount of displacement, which is measured in the displacement measurement step (S3), in a direction opposite to the direction of displacement, which is measured in the displacement measurement step (S3), that is, vertically upward Dv2 in this case.

Next, the bearings, which include the journal bearing 70 subjected to the bearing adjustment step (S4), are set on the gas turbine rotor 2 and the gas turbine rotor 2 is moved so that the gas turbine rotor 2 is housed in the gas turbine lower-half casing 5*b* (S6: gas turbine rotor movement step). The setting of the journal bearing 70 subjected to the bearing adjustment step (S4) may be performed as described below as long as the bearing housing 81 can be separated into an upper half and a lower half. First, the upper half of the bearing housing 81 is set in the upper-half bearing box 60*a*, the lower half of the bearing housing 81 is set in the lower-half bearing box 60*b*, and the pads 71, the pivots 77, and the like are set in the lower half of the bearing housing 81.

Next, the upper half of the seal ring 90 subjected to the seal ring adjustment step (S5) is mounted on the upper-half bearing box 60*a* through the upper half of the retainer 95, and the lower half of the seal ring 90 is mounted on the lower-half bearing box 60*b* through the lower half of the retainer 95. Then, the gas turbine upper-half casing 5*a* is assembled with the gas turbine lower-half casing 5*b*, and the upper-half bearing box 60*a* is assembled with the lower-half bearing box 60*b* (S7: casing assembly step).

Figure 11:
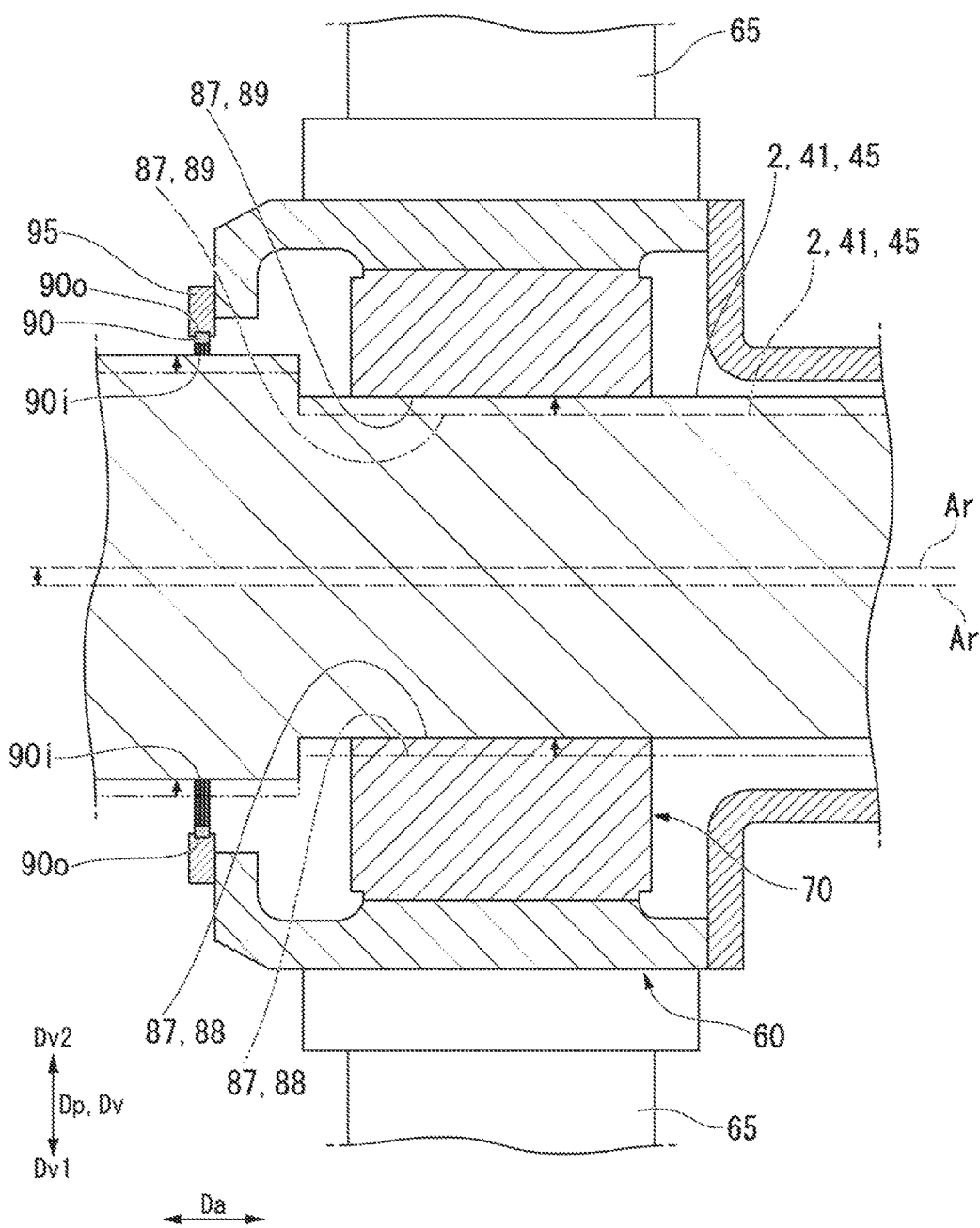
FIG. 11 is a cross-sectional view of main parts of the gas turbine after maintenance of the embodiment of the invention ends.

The maintenance of the gas turbine 1 of this embodiment ends in this way. As a result, as shown in FIG. 11, the position of the bearing box 60 in the perpendicular direction Dp is not changed, but the bearing surface 87 of the journal bearing 70 disposed in the bearing box 60 is displaced in the perpendicular direction Dp and the inner peripheral end 90*i* of the seal ring 90 mounted on the bearing box 60 is displaced in the perpendicular direction Dp. For this reason, the position of the gas turbine rotor 2, which is present at the exhaust-side bearing position, in the perpendicular direction Dp can be set to a target position, and sealability can be ensured between one side and the other side of the seal ring 90 in the axial direction Da.

A method of moving the exhaust casing 53, in which the plurality of struts 65 are formed, vertically upward Dv2 relative to the turbine body casing 52 is considered as a maintenance method in a case in which the bearing box 60 is displaced vertically downward Dv1 from a target position due to assembly errors or manufacturing errors of various components, deformation of the struts 65 (FIGS. 2 and 3) fixing the bearing box 60, or the like as described above. Flanges are fobrmed at the exhaust casing 53 and the turbine body casing 52 so that the exhaust casing 53 and the turbine body casing 52 are connected to each other as shown in FIG. 2, and a large number of bolt holes 53*h* and 52*h* are formed at the respective flanges. The exhaust casing 53 and the turbine body casing 52 are connected to each other by bolts 58 that are inserted into the respective bolt holes 53*h* and 52*h*. In order to perform this method, for example, the large number of bolt holes of one casing, among the bolt holes 53*h* of the exhaust casing 53 and the bolt holes 52*h* of the turbine body casing 52, need to be machined in the form of elongated holes in the perpendicular direction Dp. Since a long machining time is required to form the large number of bolt holes of one casing in the form of elongated holes, the machining cost is also increased. In addition, when the exhaust casing 53 and the turbine body casing 52 are connected to each other by the bolts 58, it is also necessary to prepare a jig or the like that is used to temporarily fix the exhaust casing 53 at a position where the exhaust casing 53 is moved upward relative to the turbine body casing 52 in accordance with the amount of displacement of the bearing box 60. For this reason, this maintenance method has problems in that the maintenance period is lengthened and the maintenance cost is also increased.

In the above-described maintenance method of this embodiment, it is sufficient to perform the adjustment steps for the journal bearing 70 and the seal ring 90 that are components smaller than the exhaust casing 53 and the turbine body casing 52. Accordingly, it is possible to shorten the maintenance period and reduce the maintenance cost.

Modification Example

Figure 15:
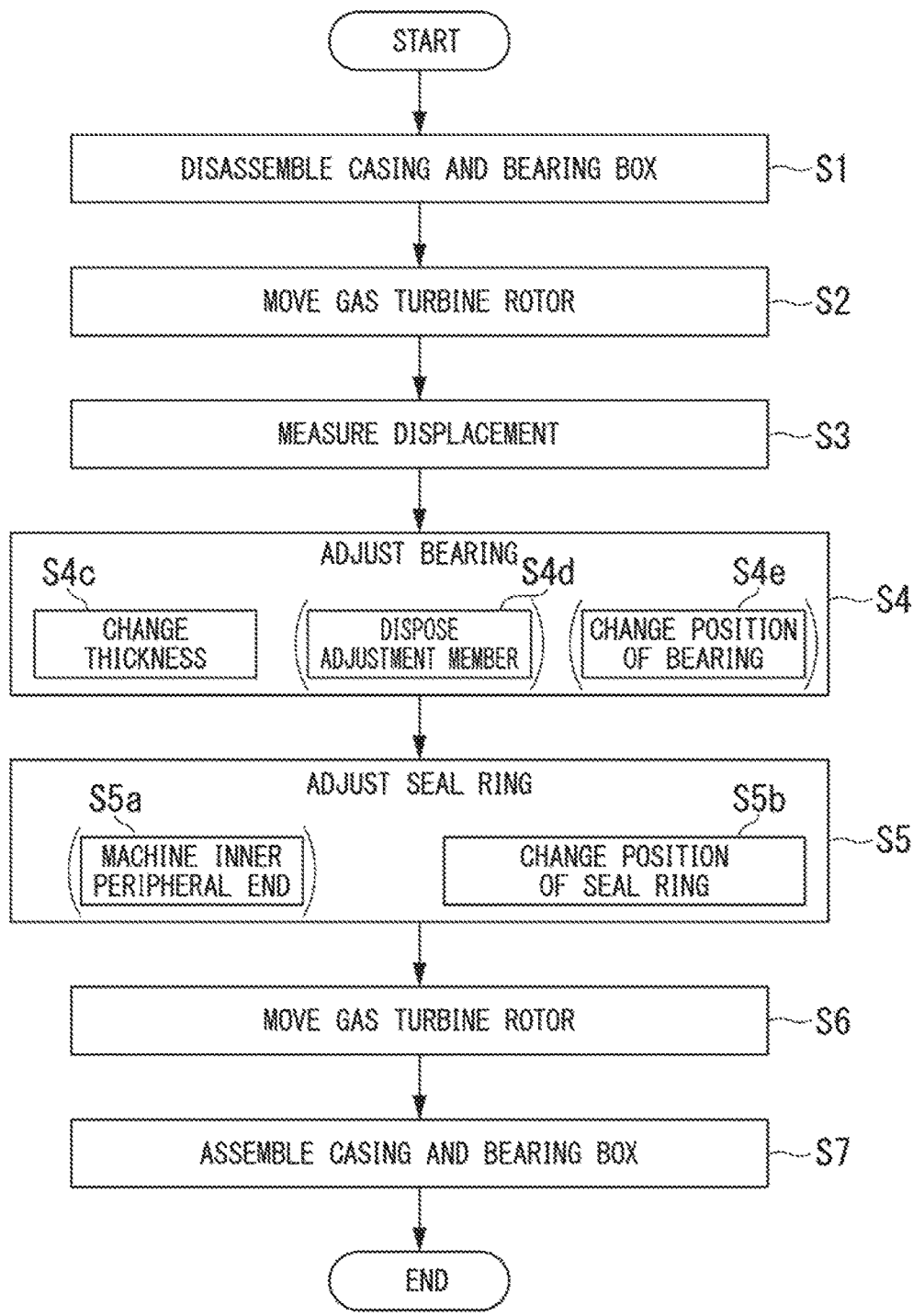
FIG. 15 is a flow chart showing a procedure of a maintenance method of a modification example of the embodiment of the invention.

The thickness change step (4*a*) for the pad 71 and the thickness reduction step (4*b*) are performed in the bearing adjustment step (S4) of the embodiment. However, as shown in a flow chart of FIG. 15, a thickness change step (S4*c*) of changing the thickness of any one component of the liner 76 and the pivot 77 (see FIG. 8), which are disposed between the outer peripheral side of the shaft portion 45 of the turbine rotor 41 and the inner peripheral side of the bearing housing 81, in the perpendicular direction Dp may be performed instead of the thickness change step (4*a*) for the pad 71. Further, the thickness of two or more components among the plurality of components, which are disposed between the outer peripheral side of the shaft portion 45 of the turbine rotor 41 and the inner peripheral side of the bearing housing 81, may be changed in the thickness change step (S4*c*).

Furthermore, an adjustment member disposition step (S4*d*) may be performed instead of the thickness change step (4*a*) for the pad 71. In the adjustment member disposition step (S4*d*) the bearing surface adjustment member 79, such as a shim, is disposed between two components, which are adjacent to each other in the perpendicular direction Dp, among the plurality of components disposed between the outer peripheral side of the shaft portion 45 of the turbine rotor 41 and the inner peripheral side of the bearing housing 81, that is, the pad 71, the liner 76, and the like (see FIG. 8), or between a component disposed on the outermost peripheral side and the bearing housing 81, or the thickness of the bearing surface adjustment member 79, which is disposed in advance, in the perpendicular direction Dp is changed.

Figure 13:
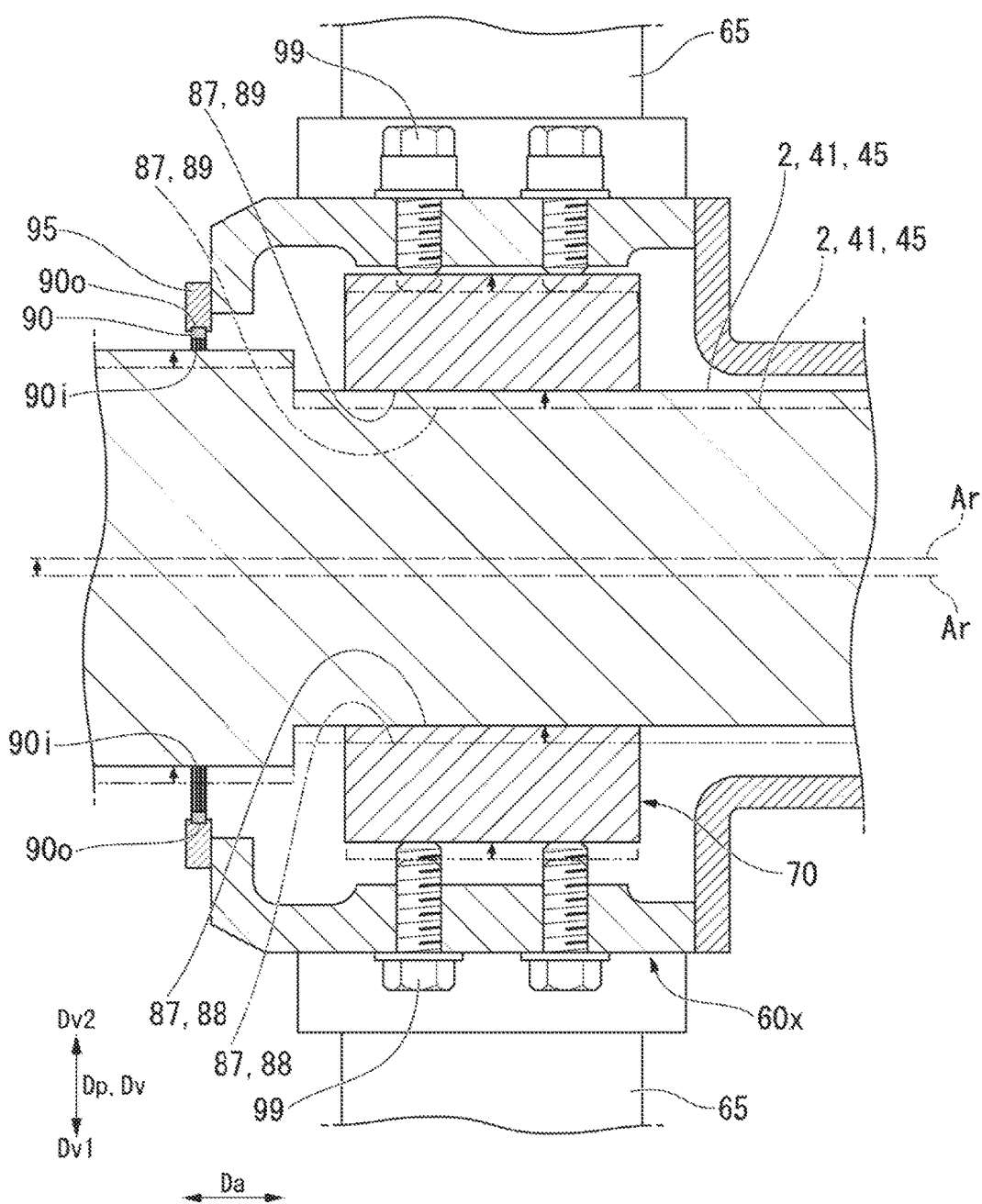
FIG. 13 is a cross-sectional view of main parts of the gas turbine after maintenance of a modification example of the embodiment of the invention ends.

Further, a bearing position change step (S4*e*) of changing the position of the journal bearing 70 relative to the bearing box 60 in the perpendicular direction Dp may be performed in the bearing adjustment step (S4) instead of the thickness change step (S4*a* or S4*c*) and the thickness reduction step (S4*b*) that have been described above. In this case, as shown in FIG. 13, a bearing box 60*x* is formed so as to allow the journal bearing 70 to relatively move in the perpendicular direction Dp inside the bearing box 60*x*, and adjusters 99 that adjust the relative position of the journal bearing 70 in the perpendicular direction Dp inside the bearing box 60*x* are provided. For example, bolts or the like, which pass through the bearing box 60*x* in the perpendicular direction Dp and of which ends come into contact with the bearing housing 81 of the journal bearing 70, can be used as the adjusters 99. The position of the journal bearing 70 relative to the bearing box 60*x* in the perpendicular direction Dp is changed by changing the screwing amount of the bolts, which are the adjusters 99, into the bearing box 60*x*.

Various steps performed in the bearing adjustment step (S4) have been exemplified in the above description, but two or more steps of the various steps may be performed together. For example, both the thickness change step (S4*a* and/or S4*c*) and the adjustment member disposition step (S4*d*) may be performed. In a case in which the amount of displacement of the bearing box 60 is large, a method of performing two or more steps of the various steps together is effective to cope with the amount of the displacement.

Figure 14:
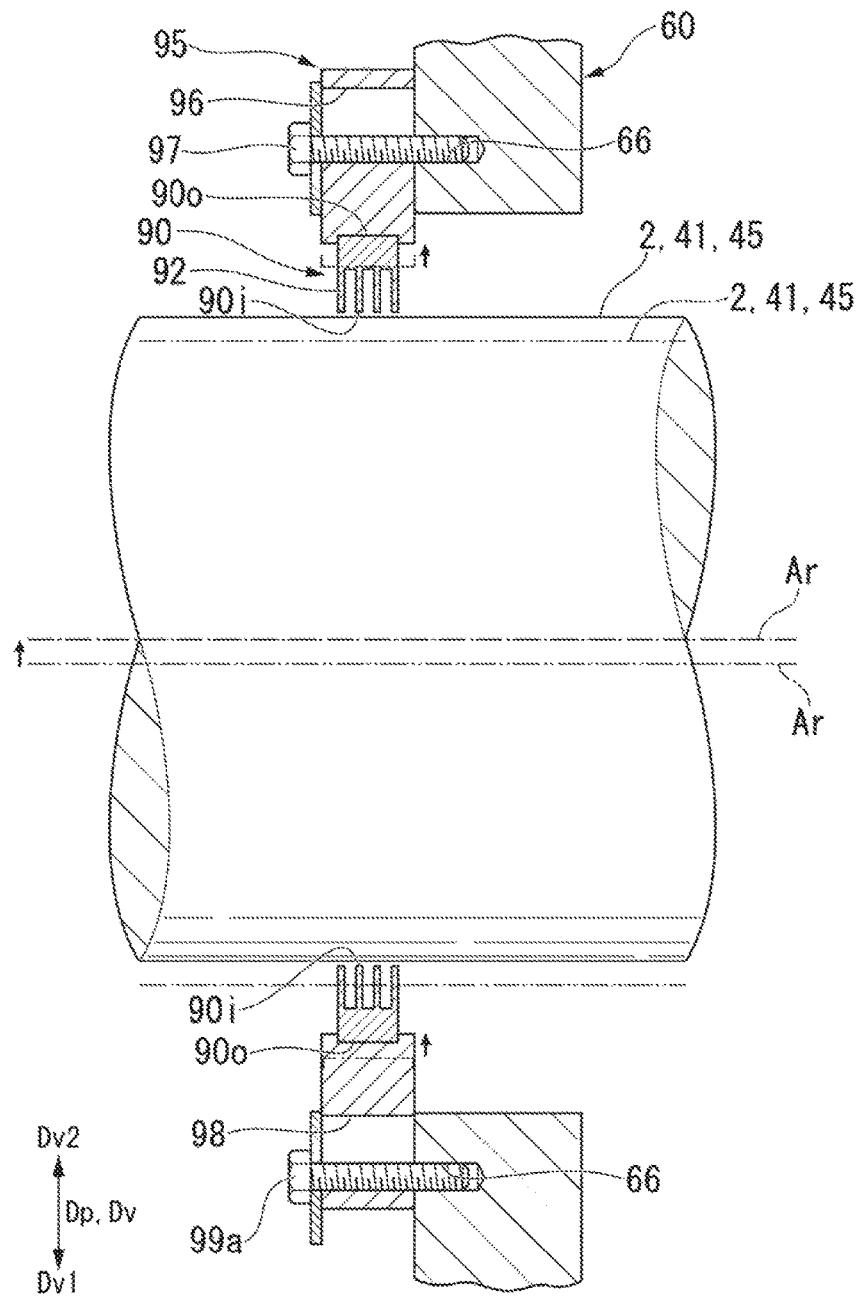
FIG. 14 is a cross-sectional view of the seal ring after a seal ring adjustment step of a modification example of the embodiment of the invention.

The inner peripheral end machining step (S5*a*) is performed in the seal ring adjustment step (S5) of the embodiment. However, a seal ring position change step (S5*b*) of changing the position of the seal ring 90 relative to the bearing box 60 in the perpendicular direction Dp may be performed instead of the inner peripheral end machining step (S5*a*). In this case, an adjuster 99*a*, which is used to adjust the position of the seal ring 90 relative to the bearing box 60 in the perpendicular direction Dp, is provided as shown in FIG. 14. For example, a hole 98, which is long in the perpendicular direction Dp, is formed at the retainer 95 that is used to mount the seal ring 90 on the bearing box 60; a screw hole 66 is formed in the bearing box 60 at a position corresponding to the hole 98 of the retainer 95; and a bolt as the adjuster 99*a* is screwed into the screw hole 66 of the bearing box 60 through the hole 98 of the retainer 95. According to this structure, it is possible to adjust the position of the seal ring 90 relative to the bearing box 60 in the perpendicular direction Dp.

Here, the inner peripheral end machining step (S5*a*) and the seal ring position change step (S5*b*) have been exemplified as steps performed in the seal ring adjustment step (S5), but the two steps may be performed together. In a case in which the amount of displacement of the bearing box 60 is large, a method of performing the two steps together is effective to cope with the amount of the displacement. Further, in the seal ring adjustment step (S5*b*), an existing seal ring 90 may be machined or a new seal ring may be produced and the seal ring 90 may be replaced with the new seal ring.

In the embodiment, the seal ring adjustment step (S5) is performed after the bearing adjustment step (S4) is performed. However, the bearing adjustment step (S4) may be performed after the seal ring adjustment step (S5) is performed.

As shown in FIG. 4, the journal bearing 70 of the embodiment includes the bearing housing 81, two pads 71, two liners 76, and two pivots 77. However, the journal bearing is not limited to the journal bearing 70 of the embodiment. For example, the journal bearing may be a journal bearing that includes a bearing housing 81, three or more pads 71, three or more liners 76, and three or more pivots 77. For example, the journal bearing may be a journal bearing that does not include the liner 76. The smooth curved surface 77*c*, which is convex toward the inner peripheral side, is formed on the pivot 77 of the embodiment, but the curved surface 77*c* may be a smooth curved surface that is convex toward the outer peripheral side. That is, any configuration in which the pivot 77 and a component, which is in contact with the pivot 77, are substantially in point contact with each other will do.

One seal ring 90 is mounted on the bearing box 60 in the embodiment, but a plurality of seal rings 90 may be mounted on the bearing box 60. In this case, the plurality of seal rings 90 are arranged in the axial direction Da.

In the embodiment, a case in which the bearing box 60 is displaced vertically downward Dv1 from a target position has been exemplified as an example of a case in which the bearing box 60 is not installed at a target position in the perpendicular direction Dp due to assembly errors or manufacturing errors of various components, deformation of the struts 65 fixing the bearing box 60, or the like; and the maintenance method in that case has been shown. However, the maintenance method is not limited to a case in which the bearing box 60 is displaced vertically downward Dv1 in the perpendicular direction Dp. For example, the maintenance method can be applied also when the bearing box 60 is displaced upward in a vertical direction, in a horizontal direction, and in an oblique direction which includes a vertical component and a horizontal component, among the perpendicular directions Dp.

INDUSTRIAL APPLICABILITY

According to an aspect of the invention, it is possible to shorten a maintenance period and reduce maintenance costs for a gas turbine.

REFERENCE SIGNS LIST

1: gas turbine
2: gas turbine rotor
5: gas turbine casing
5a: gas turbine upper-half casing
5b: gas turbine lower-half casing
10: compressor
11: compressor rotor
15: shaft portion
21: compressor casing
25: combustor casing
30: combustor
40: turbine
41: turbine rotor
45: shaft portion
51: turbine casing
52: turbine body casing
53: exhaust casing
60, 60x: bearing box
60a: upper-half bearing box
60b: lower-half bearing box
65: strut
70: journal bearing
71: pad
76: liner
77: pivot
79: bearing surface adjustment member
81: bearing housing
87: bearing surface
88: support bearing surface
89: restraining bearing surface
90: seal ring
90i: inner peripheral end
90o: outer peripheral end
92: tooth
95: retainer
99, 99a: adjuster

The invention claimed is:

1. A maintenance method for a gas turbine where a gas turbine exhaust-side journal bearing for supporting a gas turbine rotor is disposed in a bearing box, the bearing box is supported by a strut extending from an exhaust casing of the gas turbine toward the inside of the exhaust casing, and a seal ring which includes an annular inner peripheral end and seals between one side and the other side thereof in an axial direction of the gas turbine rotor is provided in the bearing box, the maintenance method comprising:
 a bearing adjustment step of displacing a bearing surface of the journal bearing relative to the bearing box in a perpendicular direction that is perpendicular to the axial direction in which the gas turbine rotor extends; and
 a seal ring adjustment step of displacing the inner peripheral end of the seal ring relative to the bearing box in accordance with the direction of displacement and the amount of displacement of the bearing surface.

2. The maintenance method for a gas turbine according to claim 1,
 wherein the journal bearing includes a pad on which the bearing surface is formed, and a bearing housing that supports the pad from an outer peripheral side, and
 wherein the bearing adjustment step includes a thickness change step of changing the thickness in the perpendicular direction of at least one component of one or more components, including the pad, disposed between an outer peripheral side of the gas turbine rotor and an inner peripheral side of the bearing housing.

3. The maintenance method for a gas turbine according to claim 1,
 wherein the journal bearing includes a pad on which the bearing surface is formed, and a bearing housing that supports the pad from an outer peripheral side, and
 wherein the bearing adjustment step includes an adjustment member-disposition step of disposing a bearing surface adjustment member between the pad and the bearing housing or changing the thickness of a bearing surface adjustment member, which is disposed in advance, in the perpendicular direction.

4. The maintenance method for a gas turbine according to claim 1,
 wherein the bearing adjustment step includes a thickness reduction step of cutting the bearing surface of the journal bearing.

5. The maintenance method for a gas turbine according to claim 1,
 wherein the bearing adjustment step includes a bearing position change step of changing the position of the journal bearing relative to the bearing box in the perpendicular direction.

6. The maintenance method for a gas turbine according to claim 1,
 wherein an annular outer peripheral end is formed on an outer peripheral side of the annular inner peripheral end of the seal ring, and
 wherein the seal ring adjustment step includes an inner peripheral end-machining step of machining the seal ring so that the center of the annular inner peripheral end is eccentric to the center of the annular outer peripheral end.

7. The maintenance method for a gas turbine according to claim 6,
 wherein in the inner peripheral end machining step, a part of the inner peripheral end is extended toward an inner peripheral side and another part of the inner peripheral end is cut.

8. The maintenance method for a gas turbine according to claim 1,
wherein the seal ring adjustment step includes a seal ring position change step of changing the position of the seal ring relative to the bearing box in the perpendicular direction.

9. The maintenance method for a gas turbine according to claim 1, further comprising:
a displacement measurement step of measuring the amount of displacement and the direction of displacement of an actual position of the gas turbine rotor in the perpendicular direction at the bearing position with reference to a predetermined position of the gas turbine rotor in the perpendicular direction at the bearing position in the axial direction,
wherein in the bearing adjustment step, the bearing surface of the journal bearing is displaced relative to the bearing box according to the amount of displacement in a direction opposite to the direction of displacement, and
wherein in the seal ring adjustment step, the inner peripheral end of the seal ring is displaced relative to the bearing box according to the amount of displacement in a direction opposite to the direction of displacement.

\* \* \* \* \*